United States Patent [19]
Betts

[11] Patent Number: 5,878,077
[45] Date of Patent: Mar. 2, 1999

[54] APPARATUS FOR HIGH-SPEED SIMULTANEOUS VOICE/DATA COMMUNICATIONS

[75] Inventor: William Lewis Betts, St. Petersburg, Fla.

[73] Assignee: Paradyne Corporation, Largo, Fla.

[21] Appl. No.: 541,863

[22] Filed: Oct. 10, 1995

[51] Int. Cl.$^6$ .................................................. H04B 1/38
[52] U.S. Cl. ............................ 375/222; 375/216; 455/43
[58] Field of Search ................................... 375/222, 216, 375/295, 316, 261, 259; 379/93, 93.01; 370/493, 206, 276; 455/43

[56] References Cited

U.S. PATENT DOCUMENTS

| | | | |
|---|---|---|---|
| 5,162,812 | 11/1992 | Aman et al. | 375/34 |
| 5,386,590 | 1/1995 | Dolan | 375/296 |
| 5,388,124 | 2/1995 | Laroia et al. | 375/17 |
| 5,396,519 | 3/1995 | Betts et al. | 375/296 |
| 5,436,930 | 7/1995 | Bremer et al. | 375/295 |
| 5,440,585 | 8/1995 | Partridge, III | 375/222 |
| 5,446,758 | 8/1995 | Eyuboglu | 375/259 |
| 5,448,555 | 9/1995 | Bremer et al. | 375/222 |
| 5,465,273 | 11/1995 | Cole | 375/296 |
| 5,475,713 | 12/1995 | Bremer et al. | 375/261 |
| 5,506,866 | 4/1996 | Bremer et al. | 375/216 |
| 5,521,942 | 5/1996 | Betts et al. | 375/295 |
| 5,537,436 | 7/1996 | Bottoms et al. | 375/222 |
| 5,537,441 | 7/1996 | Bremer et al. | 375/222 |
| 5,559,791 | 9/1996 | Bremer et al. | 370/493 |
| 5,559,792 | 9/1996 | Bottoms et al. | 375/222 |

FOREIGN PATENT DOCUMENTS

| | | | |
|---|---|---|---|
| 0 397 537 A2 | 11/1990 | European Pat. Off. | H04L 27/00 |
| 0 549 019 A2 | 6/1993 | European Pat. Off. | H04L 25/03 |
| 0 552 034 A2 | 7/1993 | European Pat. Off. | H04L 5/02 |
| 0 633 679 A1 | 1/1995 | European Pat. Off. | H04L 25/497 |
| 0 634 856 A2 | 1/1995 | European Pat. Off. | H04L 27/34 |
| WO 93/16537 | 8/1993 | WIPO | H04L 5/16 |

OTHER PUBLICATIONS

Laroia et al., "A Simple and Effective Precoding Scheme for Noise Whiteing on Intersymbol Interference Channels", IEEE Transactions on Communications, Oct. 1993, vol. 41, No. 10, pp. 1460–1463.

Kasturia et al., "Precoding for blocking Signalling and shaped signal sets", IEEE Int'l Conference on Communications, Jun. 1989, vol. 2, pp. 1086–1090.

Laroia et al., "Coding for Intersysbol Interference Channels–Combining Coding and Precoding", IEEE Transactions on Information Theory, Jul. 1996, vol. 42, No. 4, pp. 1053–1061.

*Primary Examiner*—Stephen Chin
*Assistant Examiner*—Betsy L. Deppe
*Attorney, Agent, or Firm*—Thomas, Kayden, Horstemeyer & Risley, L.L.P.

[57] ABSTRACT

A high speed modem for simultaneously transmitting both voice and precoded digital data signals over a single communication channel. The modem is operable to combine a voice signal with a precoded digital data signal for transmission at high speeds, high power levels and low distortion previously attainable by high speed data-only modems. The voice signal is processed using conventional data processing techniques to produce a voice signal and a control signal containing information relating to the coding of the voice signal. The control signal is multiplexed and mapped for transmission with the digital data. Selected bits of the multiplexed data are used to define the rotation of the digital data and to rotate the voice vector. The digital data is precoded to compensate for and minimize noise in the communication channel. The rotated voice vector and the precoded digital data are then combined and transmitted. At a remote location, the transmitted signal is received by a receiving modem and is filtered and separated to thus recover the individual coded signals. The separation of the coded voice signal from the precoded digital data signal is performed prior to reconstruction of the precoded digital data signal. The coded voice signal is then de-rotated. The coded voice and precoded digital data signals are then individually decoded to retrieve the voice and data signals that originated at the transmitting modem.

16 Claims, 5 Drawing Sheets

APPARATUS FOR HIGH-SPEED SIMULTANEOUS VOICE/DATA COMMUNICATIONS

FIELD OF THE INVENTION

The present invention relates to high speed modems incorporating data precoding and, more particularly, to such modems operable for the transmission and reception of simultaneous voice/data signals.

BACKGROUND OF THE INVENTION

High speed data modems, well known in the art, are operable to transmit data at signaling rates of up to 28,800 bits per second over the general switched telephone network and on leased point-to-point two-wire telephone type circuits. High speed data modems are described in ITU-T recommendation V.34, entitled "Data Communication Over the Telephone Network", submitted to the telecommunication standardization sector of the International Telecommunication Union in September 1994. In order to obtain these high transmission rates, a transmitter of such modems includes a precoder operable to minimize (whiten) or compensate for noise in the communication channel which can affect the transmitted signal at such high rates. A receiver in a second modem receiving the transmission must include the necessary circuitry for reconstruction of the precoded signal.

This precoding of the data signals thus permits the attainment of high data transmission rates at high power levels and reduced signal distortion. However, these high-speed modems are unable to transmit and/or receive voice and data signal transmissions simultaneously.

It is nevertheless known to simultaneously transmit voice and data signals along a single communication line, as for example an analog telephone channel. The transmission of simultaneous voice/data signals is performed through modems specially constructed for transmitting and receiving such simultaneous signals. However, these modems are unable to transmit simultaneous voice/data signals at the high power rates and reduced distortion achievable by a modem which incorporates precoding of the data signal.

It would thus be desirable to provide a high speed simultaneous voice/data modem incorporating data precoding and that is capable of maintaining power levels above and distortion below that achievable by conventional simultaneous voice/data modems.

SUMMARY OF THE INVENTION

The teachings of the present invention enable the transmission of simultaneous voice and data signals in a high speed modem, i.e. at transmission rates of up to (and potentially beyond) 28,800 bits per second, while maintaining power levels above and signal distortion below that achievable by conventional, heretofore known simultaneous voice/data modems.

To accomplish this objective, analog voice signals input to the modem are coded in accordance with known procedures to produce voice vector signals and control signals, while digital data signals input to the modem, e.g. as by a user, are precoded prior to conventional digital data coding and combination with the voice signal for transmission.

A modem constructed in accordance with the invention includes a first-in-first-out (FIFO) buffer which accepts as its input both the control signal produced during coding of the analog voice signal and the digital data signal, and multiplexes these signals. The multiplexed data is then delivered to either a mapper, a shell mapper or a differential encoder. The data is mapped and rotated in the mapper and data which is delivered through the differential encoder to the mapper, along with certain data delivered directly to the mapper and a feedback bit input to the mapper, are selected as representative bits to define or represent the rotation of the mapped data signals. After passing through the mapper, the multiplexed data is precoded to reduce and compensate for the effects of noise which may be picked up by the signal during transmission.

The selected representative data bits defining the rotation of the mapped digital data signals are delivered directly to a rotator in which they are combined with the voice vector signal. The analog voice signal is coded, prior to being input to the rotator, in accordance with conventional coding techniques as mentioned herein. The rotator functions to rotate the voice vector signal in accordance with the rotation defined by the selected representative data bits. The rotated voice vector signal may also be precoded or pre-emphasized to improve the frequency response of the signal and to compensate for filtering at the remote receiving modem. The precoded digital data signal and the rotated voice signal are then combined in an adder and delivered to a non-linear encoder which encodes the combined signal using conventional techniques for transmission to a remote modem through and across a communication channel.

The combined signal transmitted across the communication channel is received by the remote modem. The received combined signal is demodulated, equalized and non-linearly decoded. The voice vector signal and the precoded digital data signal are next filtered and separated, and the precoded digital data signal is reconstructed in accordance with the preceding techniques used in the transmitter to obtain the original mapped signals. The voice vector signals are then de-rotated in accordance with a control signal received from the circuit reconstructing the precoded digital data signal. The mapped digital data signals are then decoded to retrieve the original digital data signal received at or input to the transmitting modem. The derotated voice vector signals are also decoded in accordance with the coding techniques used in the transmitter to thereby retrieve the original analog voice signal received at the transmitter modem.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, in which like reference numerals denote similar elements throughout the several views.

DETAILED DESCRIPTION OF THE PREFERRED EMBODIMENTS

Figure 1:
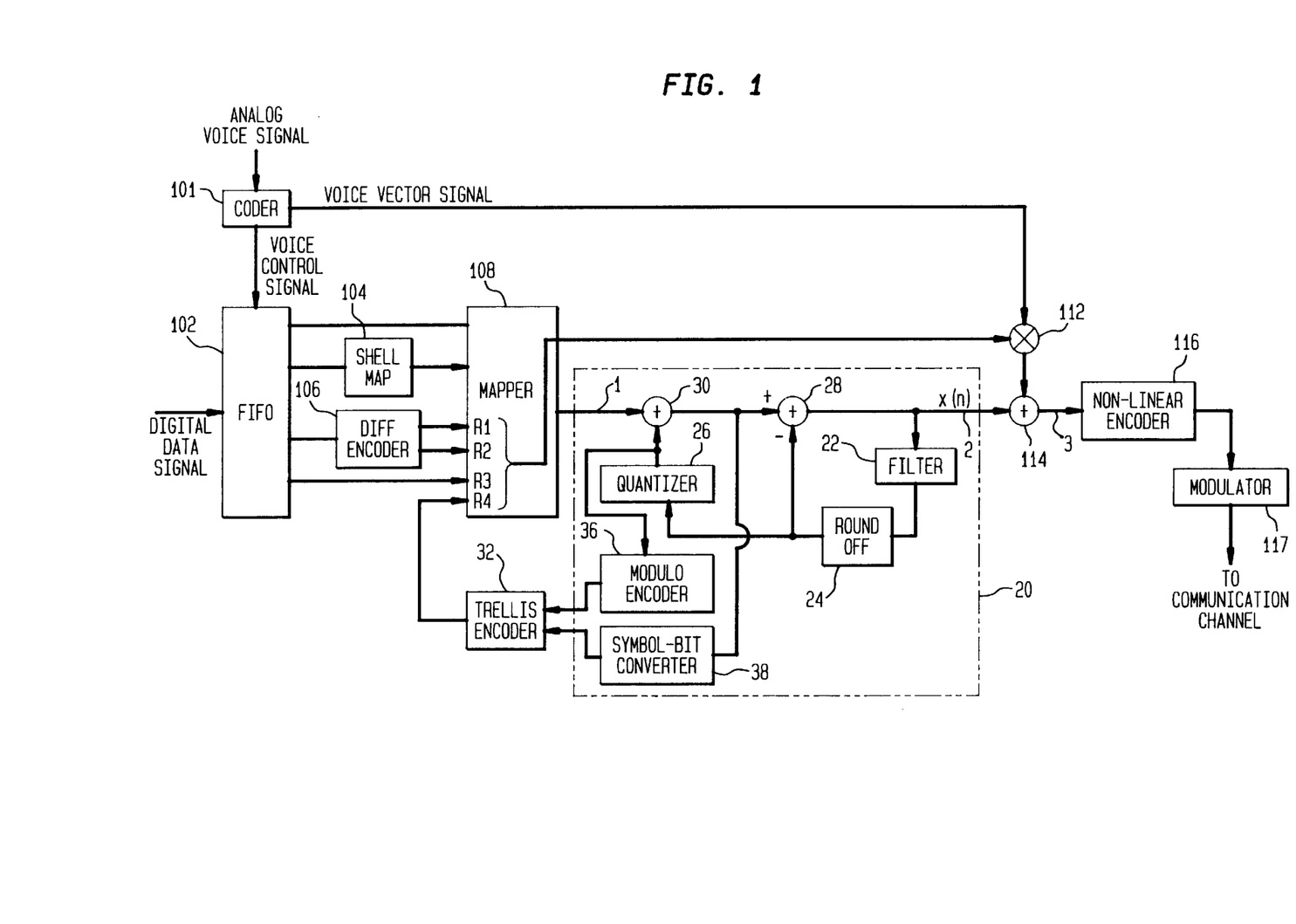
FIG. 1 is a block diagram of a transmitter of a simultaneous voice/data modem constructed in accordance with the present invention.

The present invention will now be described with particular reference to the drawings. FIG. 1 depicts a transmitter arrangement or portion of a simultaneous voice/data modem constructed in accordance with the present invention and identified by the general reference numeral 100.

Both the analog voice and digital data signals are input to an originating modem, e.g. by a user. The analog voice signal is processed in a coder 101 as, for example, in accordance with conventional coding techniques to produce a voice vector signal and a digital voice control signal that provides information relating to the coding of the analog voice signal. The user-input digital data signal and the voice control signal are applied to a first-in-first-out (FIFO) buffer 102 in which the two signals are multiplexed and from which certain predetermined bits of the multiplexed signals are delivered to a respective one of a shell mapper 104, a differential encoder 106, or a mapper 108. The predetermined selection of which of the bits of multiplexed data are directed to which such device is not critical so long as the routing is consistent or standardized throughout the industry (or at least as to the transmitting and receiving modems) such that each modem routes the same bits to the same such devices. It is generally anticipated, by way of preferred example, that the first (in time) encoded bits are directed to shell mapper 104 as the shell mapper takes more time to process data than the other devices. Thus, as preferred the shell mapper 104 processes the fractional bits associated with high speed transmissions, these fractional data bits being mapped so that transmission of the input data is accomplished in the most efficient manner. Fractional data bits occur when transmitting data at very high speeds, as for example at a 3,200 hertz symbol rate indicating the transmission of 3,200 symbols per second. With the modem transmitting at (for example) 14,400 bits per second, the 3,200 symbols being transmitted each second will not divide evenly into the 14,400 bits per second that transmission allows, resulting in a transmission rate of 4½ bits per symbol. The shell mapper 104 will accordingly map the fractional bits over an 8 symbol frame; the data is thus mapped to transmit 36 bits over 8 symbol times or an average 4½ bits per symbol time. If the transmission does not require fractional bit mapping then the shell mapper 104 will serve no specific function and will merely pass the input data bits directly therethrough to mapper 108.

The voice control signal obtained through processing of the analog voice signal in coder 101 is passed from FIFO 102 directly to mapper 108. Mapper 108 maps and rotates the received digital data from which four predetermined bits R1, R2, R3 and R4 are selected. These selected bits define two rotational control symbols or tokens used to define the rotation of the digital data signal. The first two-bit rotational symbol, defined by bits R1 and R2, are selected from data passed through differential encoder 106. The rotational bit represented by R3 is selected from data passed directly from FIFO 102 to mapper 108. Rotational bit R4 is a feedback symbol from a trellis encoder 32, as described hereinafter with respect to preceding of the digital data signal. The mapping of these bits is conventional in the art and, thus, further express discussion thereof is not deemed necessary. Bits R3 and R4 define the second rotational symbol.

The selected rotational control symbols defined by bits R1, R2, R3 and R4 are directed from mapper 108 to a rotator 112 to which the voice vector signal obtained through coding of the analog voice signal is also input to rotator 112. In rotator 112, the voice vector signal is rotated in accordance with the rotational information of the selected bits R1, R2, R3, R4 which, as described hereinabove, define the rotation of the digital data signal received by mapper 108. Thus, the voice vector signal is correspondingly rotated in accordance with the rotation of the digital data signal. If the digital data signals were not rotated then the rotator 112 will have no effect on the voice vector signal.

Figure 5:
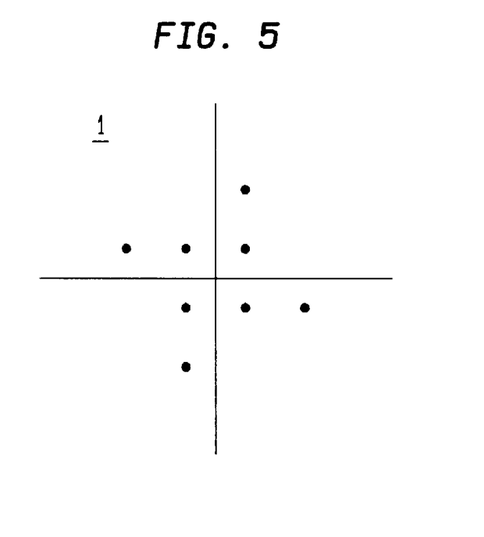
FIG. 5 is a graphical representation of the signal produced by the mapper.

The coded digital data mapped and rotated by mapper 108 is delivered to a precoder 20 in which a dither signal is added thereto. FIG. 5 illustrates the mapped data signal constellation, including the digital data signals and the voice control signal, at the output of mapper 108; the signal defining this constellation is taken at the point labelled "1" in FIG. 1. The digital data signals may thus be represented as a plurality of discrete points.

Figure 6:
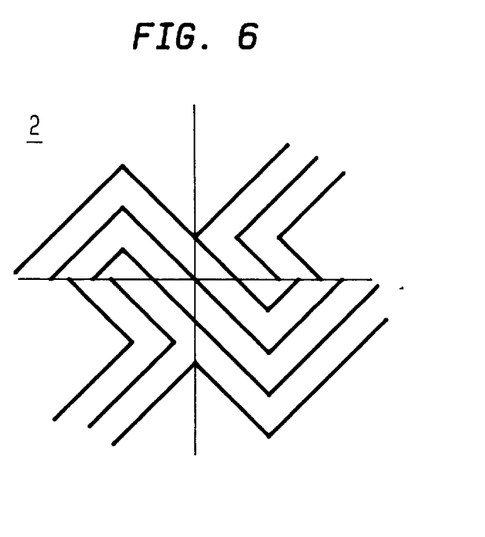
FIG. 6 is a graphical representation of a precoded digital data signal.

Precoder 20 receives the digital data signals from mapper 108 as the input to a filter 22, e.g. a finite impulse response filter and round-off device combination. The output of filter 22 is applied to a round-off device 24 in which the output of the filter is rounded to an integer value having a predetermined number of bits. This provides symmetry within the transmitting modem for aiding in proper subsequent decoding of the signals at the receiving modem. If the signal has been rounded by filter 22, then the round-off device 24 has no effect on the filter output. The output of round-off device 24 is applied to both a quantizer 26 and a negative or inverting input of a subtractor 28. In quantizer 26, the output of the round-off device 24 is quantized to produce a dither vector. The dither vector is then fed to an adder 30 in which it is added to the digital data signal input to precoder 20. The summed output of adder 30 is fed to a positive input of the subtractor 28 in which the output of round-off device 24 is subtracted therefrom to produce the output x(n) of precoder 20 taken at the point labelled "2" in FIG. 1 and which may be graphically illustrated as shown in FIG. 6. The output of subtractor 28 is also applied as an input to filter 22.

Precoder 20 functions to maintain the signal transmission power as a substantially flat spectrum, thus producing a higher signal level at the receiving end of the communications channel. The precoder 20 adds the dither vector produced by quantizer 26 to the transmitted signal to thereby control the magnitude of the signal so that it remains within the normal or intended power range. Quantizer 26 further acts to limit the magnitude of the dither vector; reduction of its magnitude also reduces distortion of the transmitted signal and allows for data transmission at a higher power level.

The output of quantizer 26 is also fed to a modulo encoder 36 which acts to correct the state of the precoded signal. The output of adder 30 is also fed to a symbol to bit converter 38. Intermediate signals of precoder 20 at different stages of its operation are fed through modulo encoder 36 and symbol to bit converter 38 to trellis encoder 32. Trellis encoding is well known and produces a trellis output signal that is fed back to mapper 108 as rotational symbol R4.

More particularly, trellis encoder 32 is disposed in a feedback loop with precoder 20 so as to decrease the expansion of the signal constellation and reduce the magnitude of the dither vector that is added to the data signal. The trellis encoder 32 additionally provides the redundancy bit selected as rotational bit R4 to mapper 108 for improved performance, and adds to the transmission fractional data which is accounted for by shell mapper 12.

FIG. 6 graphically depicts the signal constellation x(n) at the output of precoder 20 and labelled "2" in FIG. 1. The precoder 20 operatively fills the transmission constellation and adds the dither vector which may be graphically illustrated as a vector used to minimize and compensate for noise in the transmission channel. This filling of the constellation and addition of the dither vector effect sufficient noise reduction in the communication channel to provide a 1–2 dB improvement in a bad channel.

Figure 7:
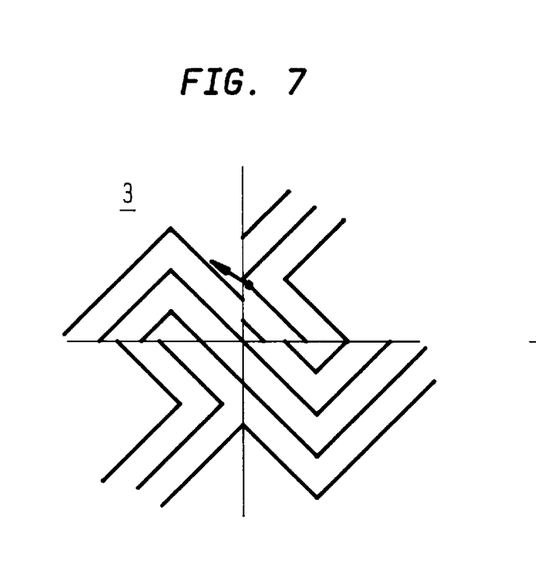
FIG. 7 is a graphical representation of voice and data signals combined for transmission in accordance with the present invention.

The precoded data signal x(n) is applied to an adder 114 in which it is added to the rotated voice vector signal from coder 101. FIG. 7 illustrates the combined precoded digital data and voice vector signals at the output of adder 114 and labelled "3" in FIG. 1. The voice vector is shown as a vector attached to or having its origin at the precoded digital data signal to which it is added. In conventional voice/data transmissions, the power level of the voice signal is maintained such that, when illustrated graphically, the voice signal vector does not extend past the boundaries of its originating quadrant and thus regulates the voice signal power level. Decoding errors are thereby minimized at the receiver. In adding the voice signal to the precoded data signal, the dither vector is added to and effectively shifts the voice vector signal; this shift may, in some instances, extend the voice signal vector into a quadrant different from that of the data signal to which it is attached. Unlike conventional simultaneous voice/data transmissions in which such a shift of the voice signal vector into a different quadrant normally results in a decoding error at the receiver, no such decoding errors result in the practice of the present invention as the voice vector signal will be shifted back to its original quadrant and magnitude upon subtraction of the dither vector prior to decoding. In any event, the combined voice and data signals from adder 114 are passed through a non-linear encoder 116 and a modulator 117 in which the signals are modulated or encoded for transmission to a remote receiving modem in accordance with conventional techniques.

Figure 2:
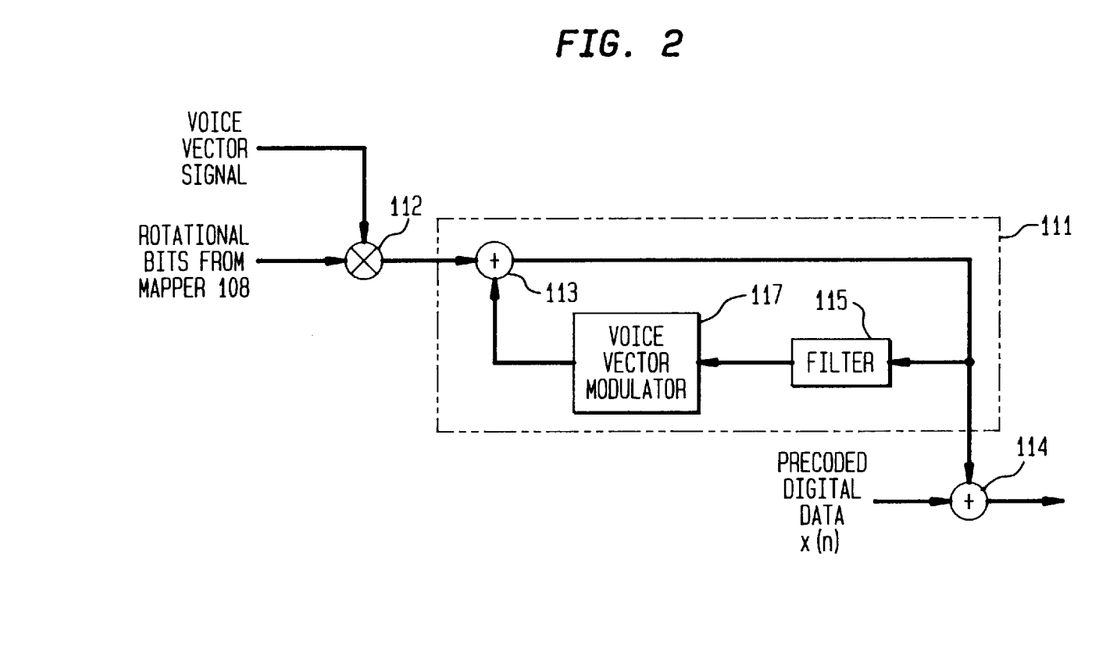
FIG. 2 is a block diagram of a voice vector signal pre-emphasis circuit for use with the transmitter of FIG. 1.

FIG. 2 illustrates a pre-emphasis circuit 111 which may optionally be implemented or incorporated in the transmitter of FIG. 1 for preceding or pre-emphasizing the voice vector signal prior to combination with the precoded digital data signal. This circuit performs a similar function to that of the data precoder, operating to improve the frequency response of the voice vector signal upon filtering and decoding at the receiver. Pre-emphasis circuit 111 of FIG. 2 is connected as a feedback loop between the rotator 112 and adder 114. In circuit 111, the rotated voice vector signal from rotator 112 is applied to an adder 113, the output of which is delivered to both an adder 114 and a filter 115, e.g. a combined finite impulse response filter and round-off device. Filter 115 filters the rotated voice signal and provides a filtered feedback signal to adder 113 for addition to the rotated voice vector signal, thus pre-emphasizing the rotated voice vector signal. A voice vector modulator 117 may also be interposed between the output of filter 115 and adder 113 positioned to receive the filtered signal from filter 115 and provide further modulation and pre-emphasis of the rotated voice vector signal. The inclusion of the pre-emphasis circuit 111 in the transmitter of FIG. 1 has the detrimental effect of slightly increasing the power in the transmitted signal. However, this effect is greatly outweighed by the improved frequency response of the signal received at the receiver.

At the remote or receiving modem (FIG. 3), the transmitted signals are input from the communications channel and initially passed through an equalizer 118 and a nonlinear decoder 120 in which the signals are equalized and decoded in accordance with well known modem technology and the corresponding coding techniques employed in the transmitting modem. The signal present at the output of nonlinear decoder 120, depicted in FIG. 7 and labelled "3" in FIG. 3, is the same signal as that present at the input of the nonlinear encoder 116 of the transmitting modem 100.

Figure 3:
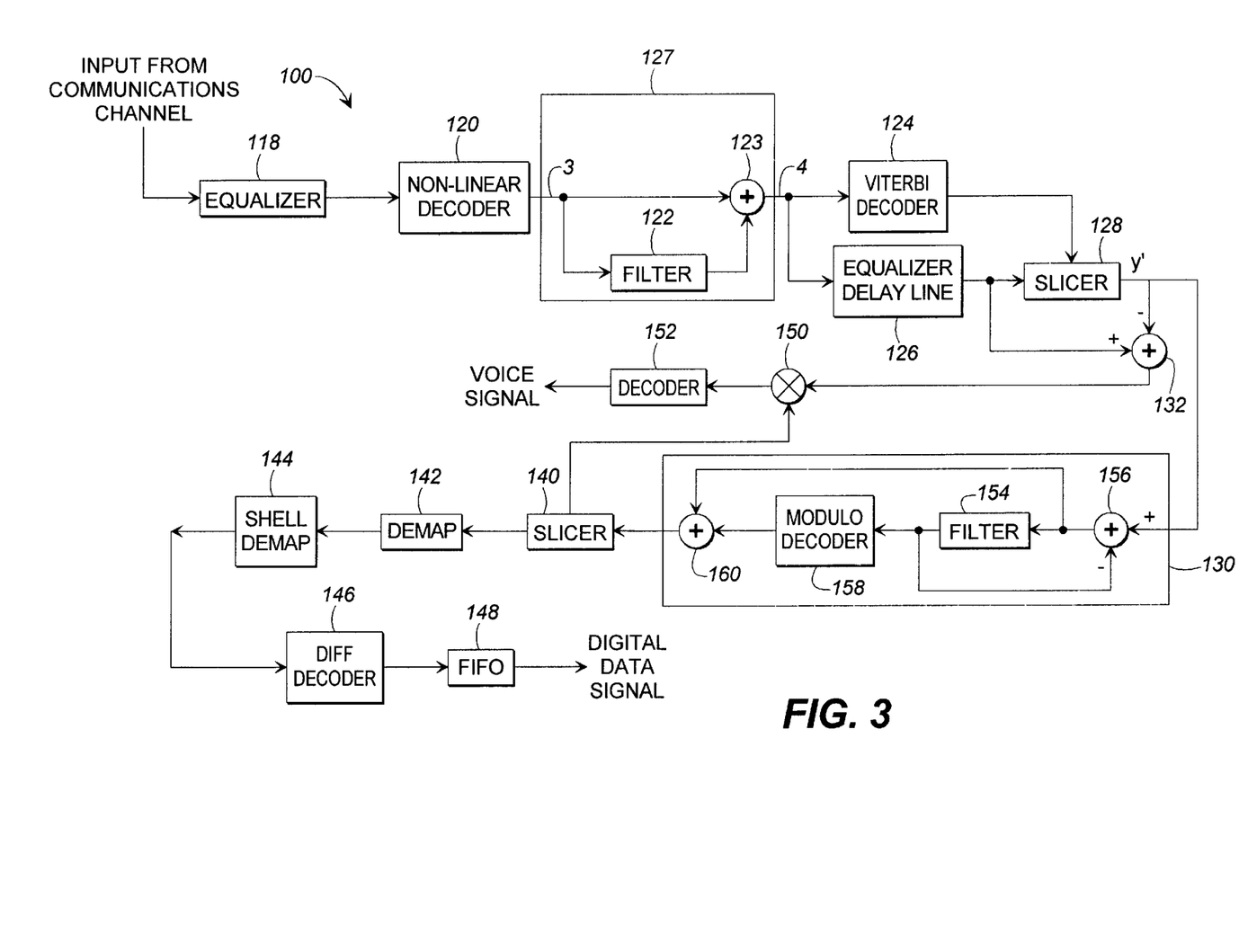
FIG. 3 is a block diagram of a receiver of a simultaneous voice/data modem constructed in accordance with the present invention.
Figure 8:
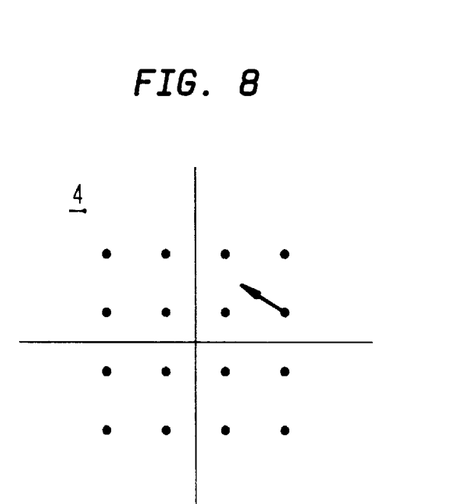
FIG. 8 is a graphical representation of a combined voice and data signal after receipt and filtering in the inventive receiver.

The decoded signal from decoder 120 is next passed through a noise whitening filter 127, e.g. a combined finite impulse response filter and round-off device 122 in a feed forward arrangement with adder 123, which removes the dither vector and outputs a signal consisting of a plurality of distinct points representing the precoded digital data and the voice vector signal, as depicted in FIG. 8 and labelled "4" in FIG. 3. Noise whitening filter 127 is made up of precoder filter 122 connected in a feed forward arrangement, so that the output of precorder filter 122 is added to the output of the non-linear decoder 120 in an adder 123. As seen in FIG. 8, more distinct points are there present than in the graph of FIG. 5 which represents the signal constellation prior to preceding for transmission. This increase is due to the filling, as previously described, of the signal constellation during preceding. The additional points in the received constellation thus represent artificial points generated by the precoder and are identified by a precoder reconstruction circuit 130 which, through conventional reconstruction techniques, operates to identify and remove the artificial points present in the FIG. 8 constellation. The exact manner of removal of the additional points is well known and conventional in the art and in currently available data modems incorporating preceding and precoder reconstruction. It will also be seen in FIG. 8 that the voice vector signal has shifted into a single quadrant and no longer extends into a second quadrant; this is due to the removal or subtraction of the dither vector. As previously described, the addition of the pre-emphasis circuit 111 in the transmitter of FIG. 1 acts to flatten the transmitted signal, thus compensating for the effects of noise whitening filter 127. Without such pre-emphasis, filter 127 will de-emphasize or attempt to decode, and thus detrimentally affect, an unemphasized or uncoded voice vector signal.

The output of filter 127 is passed to both a Viterbi decoder 124 and an equalizer delay line 126. The Viterbi decoder 124 detects and identifies the rotation of the voice/data signal, i.e. the rotation defined by the selected data bits R1, R2, R3 and R4 that were used to rotate the voice vector signal at the transmitter, and produces a corresponding de-rotation signal. Delay line 126 is positioned in parallel interconnection with Viterbi decoder 124 to effectively compensate for delays associated with the processing and generation of the de-rotation signal in the Viterbi decoder. As previously pointed out, the signal is normally rotated in the transmitting modem to effectively resist interference in the communications channel; absent such rotation, the transmitted signal is very sensitive to interference, the data bits R1, R2, R3, R4 have no effect on the voice signal when input to the transmitter rotator 112, and the Viterbi decoder 124 simply passes the unmodified signal directly to a slicer 128.

Slicer 128 receives, as its input, both the output from Viterbi decoder 124 and the delayed signal from equalizer delay line 126, which is the same signal received from adder 123. Slicer 128 separates the data signal from the voice vector signal and delivers the separated data signal to both a precoder reconstruction circuit 130 and the negative or inverted input of a subtractor 132.

The data signal separated by slicer 128 and graphically depicted by the plurality of discrete points in FIG. 8 is next passed to precoder reconstruction circuit 130. Circuit 130—the construction and operation of which are conventional in the art—effectively reconstructs the data signal that was delivered to precoder 20 in the transmitting modem. The artificial points in the constellation of FIG. 8 but not present in that of FIG. 5 are identified by precoder reconstruction circuit 130, as conventionally known and mentioned hereinbefore. More particularly, the input signal to circuit 130, after passage through a subtractor 156, is applied to a filter 154, e.g. a combined finite impulse response filter and round-off device, whose output is fed back to the subtractor 156 for subtraction from the output of slicer 128. The output of filter 154 is also applied to a modulo decoder 158 and then to an adder 160 in which it is combined with the output of subtractor 156. The output of adder 160 is delivered to a slicer 140 which removes the artificial constellation points identified by precoder reconstruction circuit 130 and compensates the de-rotation signal produced by Viterbi decoder 124 for the effects of these artificial points.

Subtractor 132 receives the delayed output from the equalizer delay line 126 at its positive or non-inverted input and subtracts therefrom the separated data signal delivered to its negative or inverted input from slicer 128. The resultant voice vector signal from subtractor 132 is then applied to a derotator circuit 150 together with the compensated de-rotation signal from slicer 140, thus effectively de-rotating the voice vector signal. Use of the compensated de-rotation signal from slicer 140 compensates the de-rotation signal, the artificial bits affecting the signal having been identified by the precoder reconstruction circuit 130.

Figure 4:
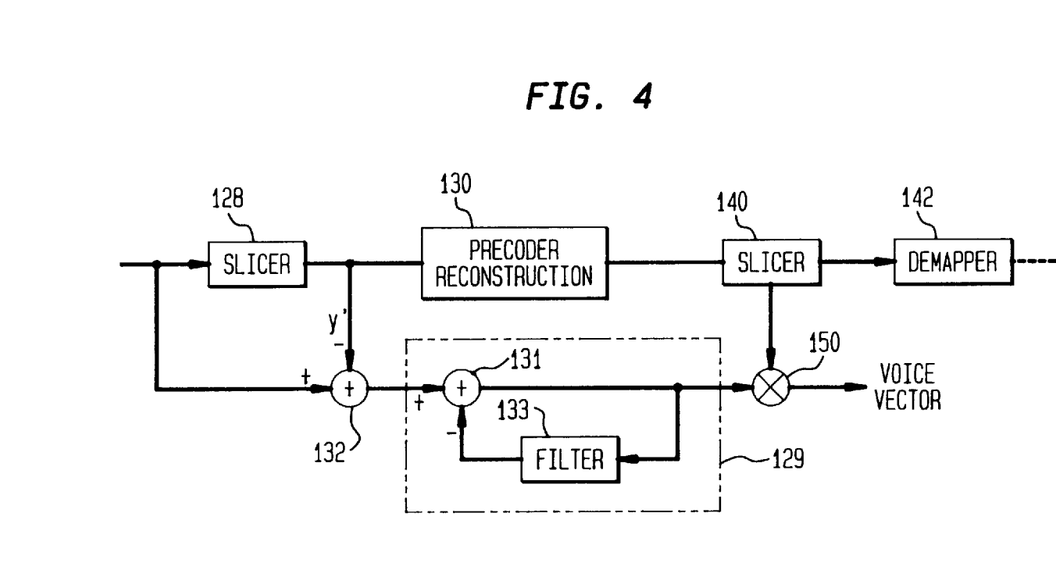
FIG. 4 is a block diagram of a filter for compensating the voice vector signal after separation from the precoded digital data signal for us in the receiver of FIG. 3.

The filter circuit 129 of FIG. 4 may optionally be interposed between subtractor 132 and de-rotator 150 in the arrangement of FIG. 3 to compensate for the effects of the noise whitening filter 127 on the voice vector signal. This filter circuit 129 would be used where the pre-emphasis circuit 111 (FIG. 2) is not incorporated in the transmitter. Thus, these two circuits perform the same function at opposite ends of the communications channel and the use of one in lieu of the other is a matter of design choice that may, for example, be standardized throughout the industry. Filter circuit 129 includes a filter 133, e.g. a combined finite impulse response filter and round-off device, that receives and filters the voice vector signal applied to rotator 150. The filtered output signal is then subtracted from the output of subtractor 132 in a subtractor 131. The so compensated signal from subtractor 131 is delivered to both filter 133 and rotator 150.

Returning to FIG. 3, the voice vector signal is de-rotated in de-rotator 150 in accordance with the compensated de-rotation signal from slicer 140, and is decoded using conventional voice signal decoding techniques in a decoder 152 to recover the analog voice signal originally input to the transmitting modem.

The data signal from slicer 140 is applied to a de-mapper 142, to a shell de-mapper 144, to a differential decoder 146, and finally to a FIFO buffer 148 from which the original digital data signal that was input to the transmitter is output.

A modem constructed in accordance with the present invention as hereinabove described is thus operable to transmit and receive voice and data signals simultaneously.

In use, the transmitter 100 of the modem receives at its input and processes an analog voice signal utilizing substantially conventional voice signal coding techniques to produce therefrom a voice vector signal and a control signal that is indicative or representative of the coding scheme used to encode the voice signal. The modem also receives, as another input, digital data and processes that data using data coding techniques that are substantially conventional for high speed modems and which incorporate preceding of the digital data. The voice control signal and digital data are delivered to FIFO buffer 102 and multiplexed prior to mapping, rotation and preceding.

The mapper maps and rotates the data for transmission and predeterminately selects, from the received digital data signal, four rotation bits which are used to define the rotation of the digital data signal. The selected rotation bits are delivered to a rotator 112 for use in rotating the voice vector signal in the same manner as the rotation of the primary data signal. The non-selected or remainder of the digital data signal bits are passed through a precoder which encodes the digital data to thereby reduce and compensate for the effects of noise to which the signal may be subjected during transmission. The rotated voice signal is combined with the precoded digital data signal, and the combined signal is delivered to a conventional nonlinear encoder 116 and modulator 117 for encoding and modulation prior to transmission in accordance with conventional signal transmission techniques. Prior to combination with the data signal, the voice vector signal may also be precoded or pre-emphasized to flatten the signal and compensate for the effects of filtering in the receiving modem.

The transmitted voice/data signal is received by a remote receiving modem in which it is passed (FIG. 3) through an equalizer 118 and a nonlinear decoder 120. The signal is then filtered in a noise whitening filter 122 to remove the dither vector added during precoding of the digital data signal and to minimize and compensate for the effects of noise in the transmission channel. The filtered signal is next applied concurrently to a Viterbi decoder 124 and to an equalizer delay line 126. The delay line passes the incoming signal with a predeterminate delay corresponding to the processing time or delay to which the same signal is concurrently subjected in the Viterbi decoder 124. The Viterbi decoder 124 generates a rotation signal, based upon the rotation of its input, which is then combined in a slicer 128 with the output of the equalizer delay line 126 to separate the precoded digital data signal from the combined signal.

The separated digital data signal is next delivered to a precoder reconstruction circuit 130. Reconstruction circuit 130 effectively reconstructs the precoded digital data signal identifying the effects, i.e. any artificial digital data signals, of the transmitting modem precoder 20. The reconstructed signal is then passed through a slicer 140 which removes the artificial digital data signals identified by reconstruction circuit 130 and compensates the de-rotation signal produced by the Viterbi decoder.

The precoded digital data signal separated by slicer 128 is also subtracted from the combined signal to obtain the voice vector signal. The voice vector signal is applied to a de-rotator 150 together with the compensated de-rotation signal from slicer 140 to effectively de-rotate the voice vector signal. The voice vector signal is then decoded in accordance with conventional techniques in decoder 152 to recover the analog voice signal originally input to the transmitting modem.

The data signal from slicer 140 is similarly decoded to recover therefrom the original data signal that was input to the transmitting modem.

Thus, the transmitting and receiving devices or portions of modems constructed in accordance with the invention, as described herein, are operable to respectively transmit and recover simultaneously-communicated voice and data signals at high speeds using precoding of the digital data signal and may also, as is preferred, incorporate pre-emphasis or preceding of the analog voice signal. Precoding of the data and voice signals minimizes the effects of noise present in the transmission or communication channel and thus permits data transmission at high power levels with low distortion. Previously, simultaneous voice and data transmissions were not attainable at such high speeds, high power levels, and low levels of distortion.

It is of course also contemplated that the transmitting and receiving portions of the inventive modem may be embodied in separate devices rather than in a single, dual-purpose apparatus operable for both transmitting and receiving simultaneous voice and data. These and like variations, which will be apparent to those skilled in the art with knowledge of this disclosure, are fully within the intended scope of the present invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A modem for simultaneously transmitting voice and precoded data signals over a single communication channel to a remote destination and for retrieving from the communications channel analog voice and precoded data signals simultaneously transmitted over the single communication channel from a remote source, the modem comprising:

a transmitter including:
data processing means for mapping a time-varying user data signal input to the transmitter to produce a mapped data signal defined by a plurality of data bits, wherein said data processing means comprises means for selecting, from said plurality of data bits, predetermined bits representing a rotation of the mapped data signal;
voice signal processing means for coding a time-varying voice signal input to the transmitter;
means for preceding the mapped data signal, wherein said means for preceding comprises a feedback encoder coupled to and for delivering a feedback bit to said data processing means, said feedback bit comprising one of said predetermined bits;
means for combining the precoded data signal with the coded voice signal, said means for combining comprising means for receiving said predetermined bits and rotating said coded voice signal after said precoding means and in accordance with said represented rotation prior to said combining of the coded voice and precoded data signals;
means for simultaneously transmitting the combined coded voice and precoded data signals over the communication channel to a remote destination;

a receiver comprising:
means for receiving from the communication channel, as an input to the receiver, simultaneously transmitted combined coded voice and precoded data signals from a remote source;
means for filtering said received combined signals;
separating means connected to said filtering means for separating the coded voice signal and the precoded data signal from the filtered combined signal;
means for decoding the separated coded voice signal to retrieve therefrom an analog voice signal originating at the remote source;
means for reconstructing the precoded data signal to define a reconstructed data signal; and
means for decoding the reconstructed data signal to retrieve therefrom a data signal originating at the remote source, said receiver further comprising means for determining rotation of and for derotating the separated coded voice signal and the reconstructed data signal.

2. The modem of claim 1, wherein said transmitter further comprises a non-linear encoder for encoding and a modulator for modulating the combined coded voice and precoded data signals prior to transmission of the combined signals over the communication channel.

3. The modem of claim 1, wherein each of said predetermined bits comprises data input to the transmitter.

4. The modem of claim 1, wherein said means for combining further comprises means for pre-emphasizing said coded voice signal.

5. The modem of claim 1, wherein said receiver further comprises means for de-emphasizing said separated coded voice signal prior to de-rotating.

6. A transmitter for use in a modem for simultaneously transmitting coded voice and precoded digital data signals over a single communication channel, the transmitter comprising:

data processing means for mapping a time-varying user data signal input to the transmitter to produce a mapped and rotated data signal defined by a plurality of bits;
means for selecting, from said plurality of data bits, predetermined bits representing rotation of said mapped data signal;
voice signal processing means for receiving and coding a time-varying voice signal input to the transmitter to generate a coded voice signal;
means for precoding the mapped and rotated data signal;
rotator means for receiving both said predetermined bits and said coded voice signal and rotating said coded voice signal after said precoding means and in accordance with the rotation represented by said predetermined bits;
means for combining the precoded data signal and the rotated coded voice signal to produce a combined voice/data signal; and
means for transmitting the combined voice/data signal across the single communication channel, wherein said means for precoding comprises a feedback encoder coupled to and for delivering a feedback bit to said means for selecting, said feedback bit comprising one of said predetermined bits.

7. The transmitter of claim 6, wherein said transmitter comprises a non-linear encoder for encoding and a modulator for modulating the combined voice/data signal prior to transmission of the combined voice/data signal over the communication channel.

8. The transmitter of claim 6, wherein said means for combining further comprises means for pre-emphasizing said rotated coded voice signal.

9. A transmitter for use in a modem for simultaneously transmitting voice and precoded data signals over a single communication channel, the transmitter comprising:

a data processor configured to map a time-varying user data signal input to the transmitter to produce a mapped and rotated data signal defined by a plurality of data bits, wherein said data processor is configured to select, from said plurality of data bits, predetermined bits representing a rotation of the mapped and rotated data signal;

a processor configured to code a time-varying voice signal input to the transmitter;

a precoder configured to precode the mapped and rotated data signal, said precoder comprising a feedback encoder coupled to and for delivering a feedback bit to said data processor, said feedback bit comprising one of said predetermined bits;

a rotator designed to rotate the coded voice signal with said predetermined bits representing a rotation of the mapped and rotated data signal, said rotator configured to receive said predetermined bits and to rotate said coded voice signal after said precoder and in accordance with said represented rotation; and a modulator configured to simultaneously transmit a combined rotated coded voice and precoded data signal over the communication channel to a remote destination.

10. The transmitter of claim 9, further comprising a non-linear encoder configured to encode and a modulator configured to modulate the combined rotated coded voice and precoded data signals prior to transmission of the combined signals over the communication channel.

11. The transmitter of claim 9, wherein each of said predetermined bits comprises data input to the transmitter.

12. The transmitter of claim 9, wherein said rotator further comprises a pre-emphasizer designed to pre-emphasize said coded voice signal.

13. A method for use in a modem for simultaneously transmitting voice and precoded data signals over a single communication channel, the method comprising the steps of:

processing a time-varying user data signal input to the transmitter to produce a mapped and rotated data signal defined by a plurality of data bits, said step of mapping further comprising the step of selecting, from said plurality of data bits, predetermined bits representing a rotation of the mapped and rotated data signal;

coding a time-varying voice signal input to the transmitter;

precoding the mapped and rotated data signal, wherein said step of precoding comprises a feedback encoder coupled to and further comprises the step of delivering a feedback bit to said processing means, said feedback bit comprising one of said predetermined bits;

rotating the coded voice signal with said predetermined bits representing a rotation of the mapped and rotated data signal, said step of rotating further comprising the step of receiving said predetermined bits and rotating said coded voice signal after said precoding step and in accordance with said represented rotation; and simultaneously transmitting a combined rotated coded voice and precoded data signal over the communication channel to a remote destination.

14. The method of claim 13, further comprising the steps of encoding and modulating the combined rotated coded voice and precoded data signals prior to transmission of the combined signals over the communication channel.

15. The method of claim 13, wherein each of said predetermined bits comprises data input to the transmitter.

16. The method of claim 13, wherein said step of combining further comprises the step of pre-emphasizing said coded voice signal.

* * * * *